(12) United States Patent
Mackness

(10) Patent No.: US 7,083,437 B2
(45) Date of Patent: Aug. 1, 2006

(54) AIRCRAFT SEAT ELECTRICAL QUICK DISCONNECT

(75) Inventor: Robert F Mackness, Tulalip, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/925,627

(22) Filed: Aug. 25, 2004

(65) Prior Publication Data

US 2006/0046582 A1    Mar. 2, 2006

(51) Int. Cl.
H01R 25/00    (2006.01)
(52) U.S. Cl. ..................................... 439/110
(58) Field of Classification Search ............... 439/110, 439/120, 111, 857, 859, 862
See application file for complete search history.

(56) References Cited

U.S. PATENT DOCUMENTS

| 4,428,078 | A | 1/1984 | Kuo ............................... 455/3 |
| 4,763,360 | A | 8/1988 | Daniels et al. .................. 455/3 |
| 4,853,555 | A | 8/1989 | Wheat .......................... 307/9.1 |
| 5,439,396 | A * | 8/1995 | Magdaleno .................. 439/716 |
| 6,601,798 | B1 | 8/2003 | Cawley .................... 244/118.6 |
| 2005/0211835 | A1 | 9/2005 | Henley et al. |
| 2005/0215095 | A1 | 9/2005 | Mitchell et al. |
| 2005/0230543 | A1 | 10/2005 | Laib et al. |
| 2005/0230548 | A1 | 10/2005 | Mitchell et al. |
| 2005/0258676 | A1 | 11/2005 | Mitchell et al. |

* cited by examiner

Primary Examiner—Javaid H. Nasri
(74) Attorney, Agent, or Firm—Harness Dickey & Pierce P.L.C.

(57) ABSTRACT

A mobile platform seat electrical connection system includes an electrical bus having multiple conductors. A C-shaped trough includes an insulating medium to fix the conductors in a parallel configuration. Each of the conductors has a bulbous or male shaped head and a neck connected to the head supporting the conductor within the trough. A neck width is smaller than a head width. Seats are positioned in the mobile platform, each having multiple C-shaped female contact members. The contact members are biased to releasably engage the head of the conductors and transfer electrical energy between the conductor and the seat. The seats can be positioned at any location along the bus.

18 Claims, 8 Drawing Sheets

AIRCRAFT SEAT ELECTRICAL QUICK DISCONNECT

FIELD OF THE INVENTION

The present invention relates in general to mobile platform electronic systems and more specifically to a power bus and seat connector device that provides electrical contact between the aircraft and individual passenger seats or groups of seats.

BACKGROUND OF THE INVENTION

Commercial aircraft passengers are increasingly demanding In-Flight Entertainment (IFE) and electrical power outlets to operate various electronic devices, such as lap top computers at their seats. To provide the passenger with such features, the electrical power and data must be delivered to each seat. Conventionally, power and data are delivered to aircraft passenger seats via numerous cables that, during aircraft assembly, are laid out in position on the floor of the aircraft passenger cabin. A portion of the cables is positioned beneath a covering, such as a seat track cover, and a portion that includes connectors to the seats is left exposed to connect with the yet to be installed seat groups containing each passenger seat.

During installation of the seat groups, the seat groups must be carried in over the exposed wires. Taking care to avoid the exposed wires increases both the complexity of the operation and the amount of time required to install the seats. Once the seats are installed, installers must crawl along the floor of the aircraft to manually attach each wire to each seat group. This process is cumbersome and time consuming. Further, in order to change the configuration of the seats or to replace the seats, an installer must again crawl along the floor, disconnect the wiring from each group, and maneuver the seats around the exposed wiring. Still further, in order to change the position of the seat groups, the aircraft must be rewired so that the wiring will reach the seats in their new positions. As would be expected, rewiring an aircraft is a costly and time consuming process.

Several methods have been developed to overcome the deficiencies noted above. An example of this includes a U.S. patent application entitled PASSENGER CABIN SEAT POWER BUS, (Ser. No. 11/090,874), filed Mar. 25, 2005, the enclosure of which is incorporated herein by reference. Various designs of a power bus and a seat track connection device are disclosed there within. Although the devices disclosed therein provide an improvement over the prior art, it is desirable to provide an improved device for delivering power to aircraft passenger seat groups that both eliminates the need to separately connect each seat group to an individual power or data cable and the need to rewire the cables if the seat configuration is changed, as well as further simplify the seat installation procedure, as well as simplify a procedure for shifting the seats to reconfigure the seating arrangement.

SUMMARY OF THE INVENTION

In one preferred embodiment an aircraft seat electrical quick disconnect system of the present invention includes an electrical bus having multiple conductors in a parallel configuration. Each conductor has a bulbous or male shaped head and a neck connected to the head which supports the conductor within the trough. A neck width of the conductor is smaller than a head width. Occupant seats are positioned in the mobile platform, each having multiple C-shaped female contact members. The contact members are biased to releasably engage the head of the conductors and transfer electrical energy between the conductor and the seat. The seats can be positioned at any location along the bus.

In another aspect of the present invention, a C-shaped trough includes an insulating medium which fixes the conductors in the parallel configuration. Each of the conductors, the trough and the insulating medium are co-extruded. The trough is positioned within a seat track. The conductors are spaced within the trough to equal the spacing between the contact members such that the contact members extending from the seat engage the conductors within the trough through an opening in the trough. A sealing cover is then positioned over the opening to keep dirt and moisture out of the trough.

An aircraft seat electrical quick disconnect system of the present invention offers several advantages. By attaching electrical connectors having female shaped connector legs to occupant seats and providing an electrical bus in the floor of the aircraft having parallel conductors arranged with the same spacing as the electrical connectors, the seats can be positioned at any location along the length of the bus and still provide connection to the bus. This permits aircraft passenger compartment configuration changes without the need to re-wire the seats. By using male shaped conductors in the bus, the conductors can be extruded together with an insulating medium within a trough. The trough can then be positioned within a seat track of the aircraft. A biased, deflectable design of the connectors provides a positive connection to the conductors at any location along the conductors.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. The invention can be applied in any mobile platform having occupant seats provided with electrical services such as aircraft, trains, busses, ferries, etc. For simplicity, the invention is herein described in reference to application in an aircraft.

Figure 1:
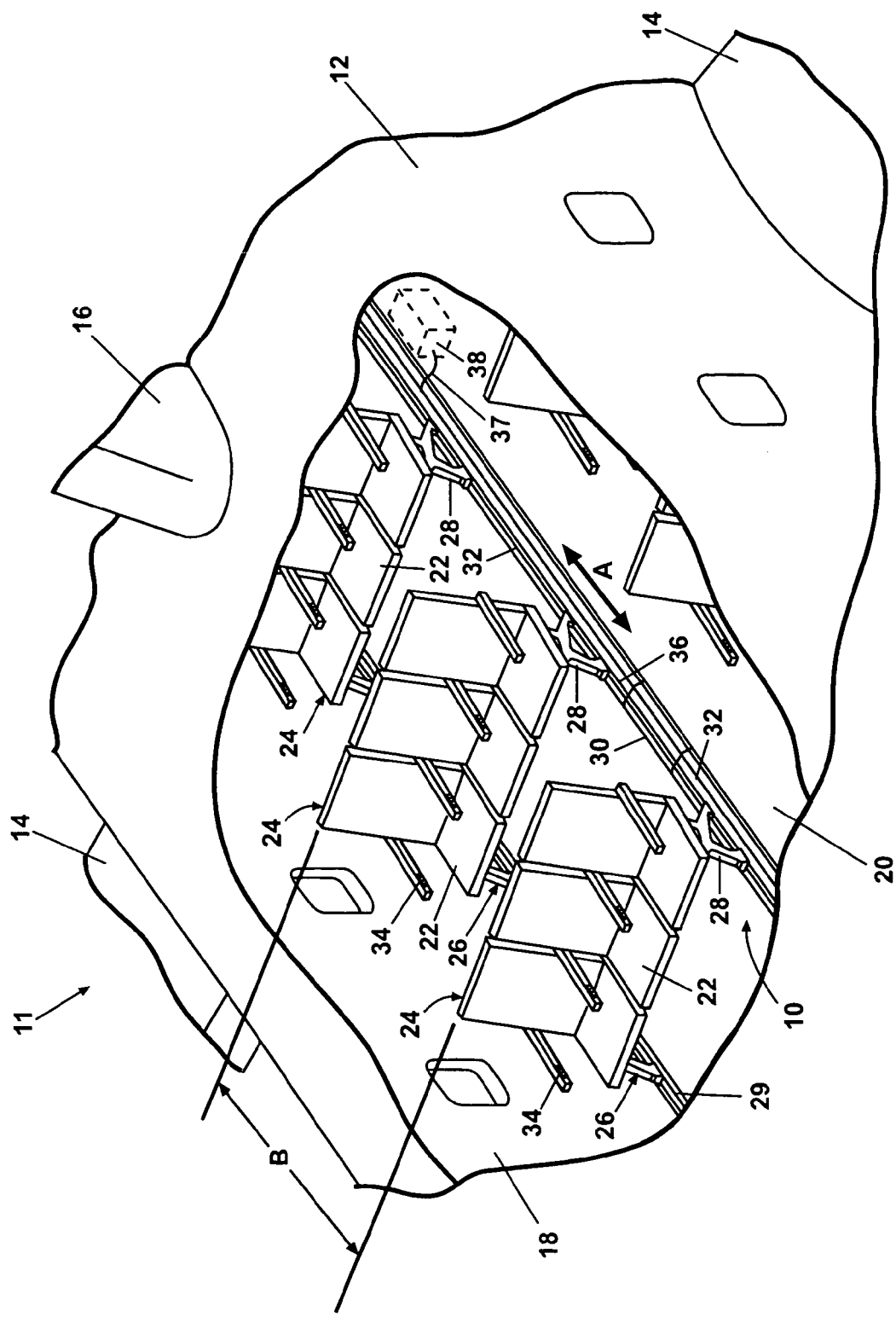
FIG. 1 is a perspective view showing an aircraft having a seat electrical quick disconnect system of the present invention.

According to a preferred embodiment of the present invention and generally referring to FIG. 1, a seat electrical quick disconnect system 10 is shown installed on an aircraft 11. Aircraft 11 includes a fuselage 12, a pair of wings 14, an elevator 16 and a passenger compartment 18. Passenger compartment 18 includes a deck 20 supporting a plurality of seat groups 22, each having individual occupant seats 24. Seat groups 22 as shown in FIG. 1 include three individual occupant seats 24, however, seat electrical quick disconnect system 10 of the present invention can be used with any quantity of occupant seats 24 forming seat groups 22.

Each seat group 22 is supported by a first seat leg 26 and a second seat leg 28. First and second seat legs 26, 28 are connected to a first seat rail 29 and a second seat rail 30, respectively. Each of first and second seat rails 29, 30 are provided with a sealing cover 32 positioned between each of the seat legs after they are connected to one of the first or second seat rails 29, 30.

Each occupant seat 24 includes an electrical device connection panel 34. Electrical device connection panels 34 provide passengers in each of the occupant seats 24 with a variety of connections to a plurality of electrical sources. The plurality of electrical sources can include at least an alternating current source, a direct current source, a telephone signal source, an Internet communication signal source, an electronic acoustic signal source, an ARINC signal source such as ARINC 429, and an electronic voice signal source. In one preferred embodiment of the present invention, the electrical sources connected to electrical device connection panels 34 include an alternating current source, a direct current source and an ARINC signal source. Each of the electrical sources are connected to the individual electrical device connection panels 34 via an electrical bus 36 which is positioned within one or both of the first and second seat rails 29, 30 and extends substantially the length of first and second seat rails 29,30. A wiring harness 37 is shown as an exemplary way to connect electrical bus 37 to any of the remotely located electrical sources shown for example as source 36 in phantom. As will be evident to a skilled practitioner, the location for each of the electrical sources connectable to seats 24 can be positioned throughout aircraft 11.

Figure 2:
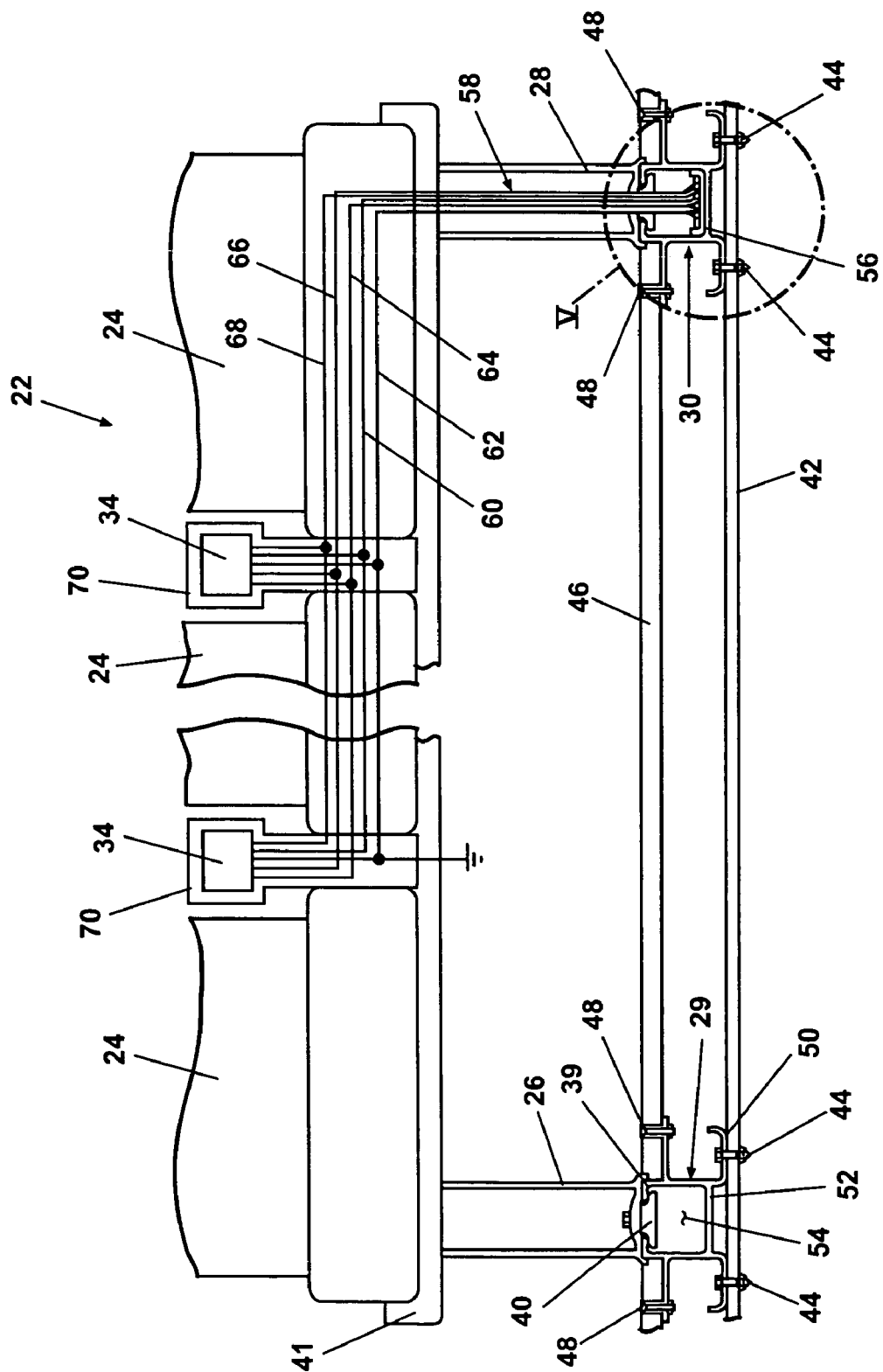
FIG. 2 is an elevational view looking aft of a seat group incorporating a seat electrical quick disconnect system of the present invention.

Referring generally now to FIG. 2, each of first and second seat rails 29 and 30 include a leg support end 39 which supports first and second seat legs 26, 28, respectively, using a fastener assembly 40. A seat support frame 41 structurally supports each occupant seat 24 to first and second seat legs 26, 28. First and second seat rails 29, 30 are themselves supported from a fuselage floor beam 42 using a plurality of fasteners 44. First and second seat rails 29, 30 can also support a floor 46 of passenger compartment 18 using a plurality of fasteners 48.

Each of first and second seat rails 29, 30 also include a connecting end 50 disposed adjacent fuselage floor beam 42, and a web 52 structurally joining various members of each of first and second seat rails 29, 30. A cavity 54 is created above web 52. Electrical bus 36, configured as a bus assembly 56, is positioned within cavity 54 of either or both first and second seat rails 29, 30 as desired.

Bus assembly 56 is electrically connectible via a wiring harness 58 to each of the electrical device connection panels 34. Within the structure of seat group 22, wiring harness 58 is divisible into a plurality of individual wires for the various services used, which for simplicity in this view include a 110 volt AC wire 60, a ground wire 62, a neutral wire 64, a DC voltage supply wire 66, and a data transfer wire 68. Wires 60 through 68 are exemplary of a plurality of individual service wires providable by wiring harness 58 to electrical device connection panels 34. The types of services provided are discretionary and may differ between individual aircraft designs. In a typical installation shown, electrical device connection panels 34 are supported within an arm rest 70 of each occupant seat 24, therefore making individual connections of the electrical device connection panels 34 available immediately to an occupant in one or all of the seats 24. Electrical device connection panels 34 can also be provided in alternate locations from arm rests 70.

Figure 3:
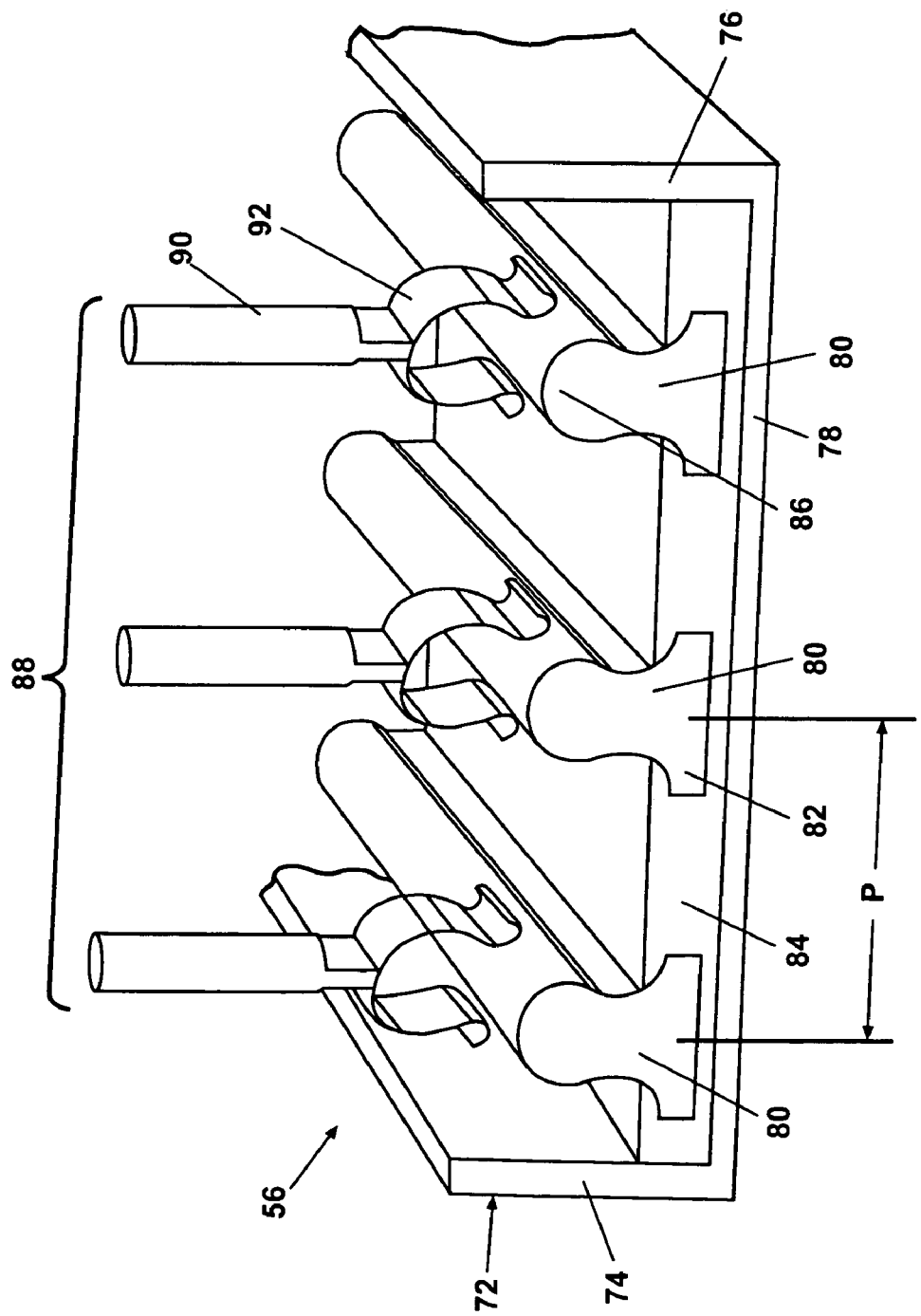
FIG. 3 is a perspective view of an electrical bus assembly according to a preferred embodiment of the present invention.

As best seen in FIG. 3, individual components of bus assembly 56 according to one preferred embodiment of the present invention include a trough 72, which includes a first wall 74, a second wall 76 and a floor web 78. Trough 72 is preferably provided of a metal material, such as cast or extruded aluminum. A plurality of conductors 80 are positioned between first and second walls 74, 76 of trough 72. Conductors 80 are provided of an electrically conductive material such as copper, and are preferably provided with a protective coating. The protective coating can be formed of a material such as rhodium or nickel, electro-deposited over the copper material, which helps prevent oxidation of the copper material. Other electrically conductive and/or coating materials can be used, therefore the invention is not limited to a particular metal or coating material for conductors 80.

Each conductor 80 includes a base 82 which is fixedly captured within an insulating medium 84. Insulating medium 84 is preferably provided from a polymeric material, for example a polyamide, which offers sufficient rigidity to retain the position of each conductor 80 in a generally parallel configuration with each other while also providing both a good moisture seal and the capability of being extruded together with the conductors 80 and trough 72. Other materials can be used for insulation medium 84 which provide electrical insulation properties, resistance to moisture permeation, and can be co-extruded with at least the conductors 80. Each conductor 80 also includes a bulbous head 86 located outside of insulating medium 84.

A plurality of connectors 88 each having a rod 90 connectively joined to a U-shaped bracket 92 are each aligned with one of the conductors 80. Rods 90 can be provided of a conductive material such as metal, including copper. U-shaped brackets 92 act as a biasing device and are provided of a spring material such as phosphor bronze having good conductivity properties, which can also be plated with a material compatible with that used for plating the conductors 80. U-shaped brackets 92 are configured to elastically deflect about bulbous head 86 of conductor 80 and return by bias spring force to grasp the exposed surface of conductor 80 such that an electrically conductive path is formed between conductors 80 and rods 90. Conductors 80 have a spacing or conductor pitch "P", which is predetermined to permit a maximum number of conductors 80 within a particularly sized trough 72 while also providing necessary clearance to prevent electrical shorting between conductors 80 and/or brackets 92.

Referring back to FIG. 1, each of the seat groups 22 is repositionable in the directions of longitudinal displacement direction arrows "A". Each group 22 is commonly separated by a seat pitch "B". With continued reference to both FIGS. 1 and 3, one advantage of the seat electrical disconnect system 10 of the present invention is to permit changing seat pitch "B" by displacing one or more of seat groups 22 in longitudinal displacement direction "A" to either increase or decrease seat pitch "B", while simultaneously maintaining electrical conductivity between U-shaped brackets 92 and each of the respective conductors 80. U-shaped brackets 92 can be slid along conductors 80 thereby allowing seat groups 22 to be longitudinally displaced without breaking electrical contact of U-shaped brackets 92 to their respective conductors 80.

Figure 4:
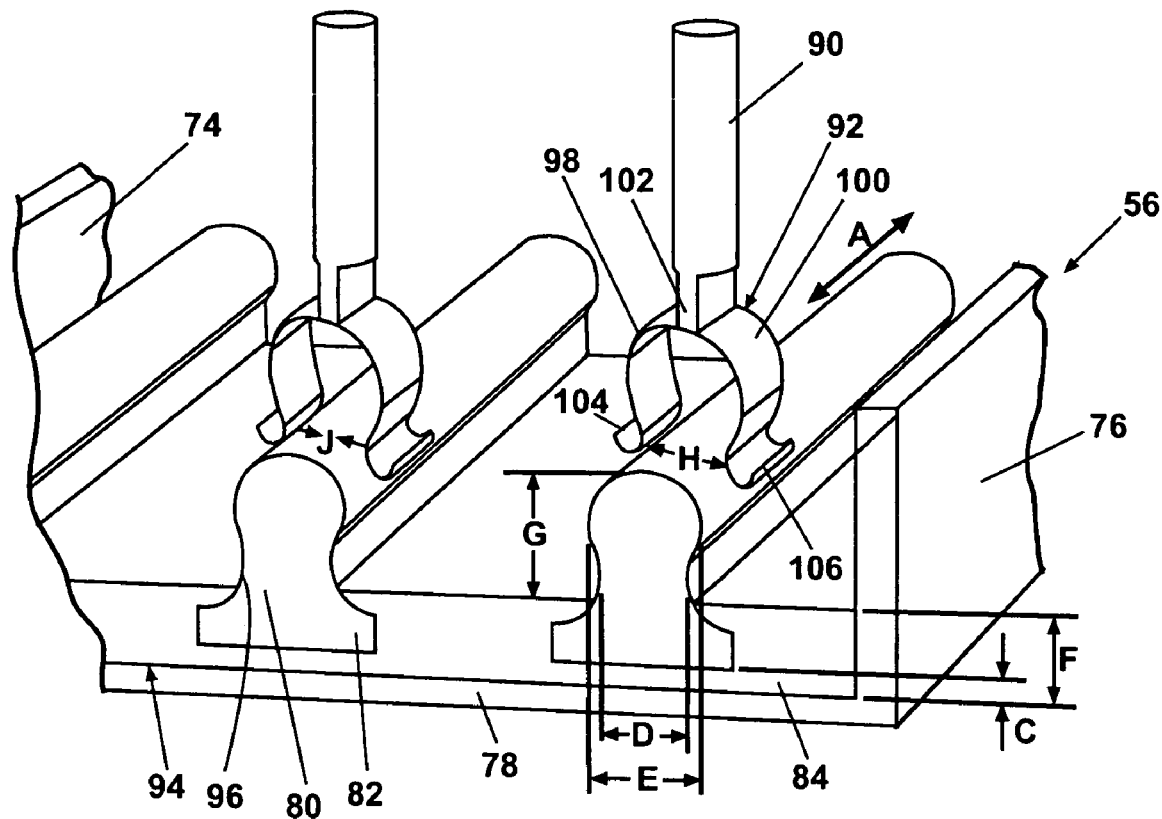
FIG. 4 is an exploded view of the perspective view of FIG. 3.

As best seen in FIG. 4, conductors 80 are electrically isolated from a surface 94 of floor web 78 by a clearance height "C" using a portion of insulating medium 84. Conductors 80 are similarly electrically isolated from each of the first and second walls 74, 76 of trough 72. Each conductor 80 includes a neck 96 having a neck width "D" and a head width "E" of bulbous head 86. Neck width "D" is a predetermined dimension less than head width "E". In one preferred embodiment of the present invention, head width "E" is approximately 0.24 cm (0.094 in). The dimensions of conductors 80 can vary depending on the current carrying capacity desired. A depth "F" of insulating medium 84 is controlled such that neck 96 is exposed above insulating medium 84. A free connector height "G" is therefore provided between neck 96 and a distal end of bulbous head 86.

Each U-shaped bracket 92 further includes first and second legs 98, 100. U-shaped bracket 92 is connected via rod distal end 102 to rod 90. This connection can be any electrically conductive connection including by welding, soldering, brazing, fastening, etc. First and second legs 98, 100 each include a first and second leg distal end 104, 106, respectively. First and second leg distal ends 104, 106 are separated by a separation width "H". Separation width "H" is predetermined to be less than neck width "D" such that a biasing force in the direction of arrows "J" for each of the first and second legs 98, 100 normally biases first and second leg distal ends 104, 106 into contact with neck 96 while also generally providing electrical contact over a substantial length of first and second legs 98, 100 about bulbous head 86. As evident in FIG. 4, displacement of rods 90 in the longitudinal displacement direction of arrows "A" retains contact between U-shaped bracket 92 and conductor 80 for any longitudinal position of U-shaped bracket 92 along conductor 80.

Figure 5:
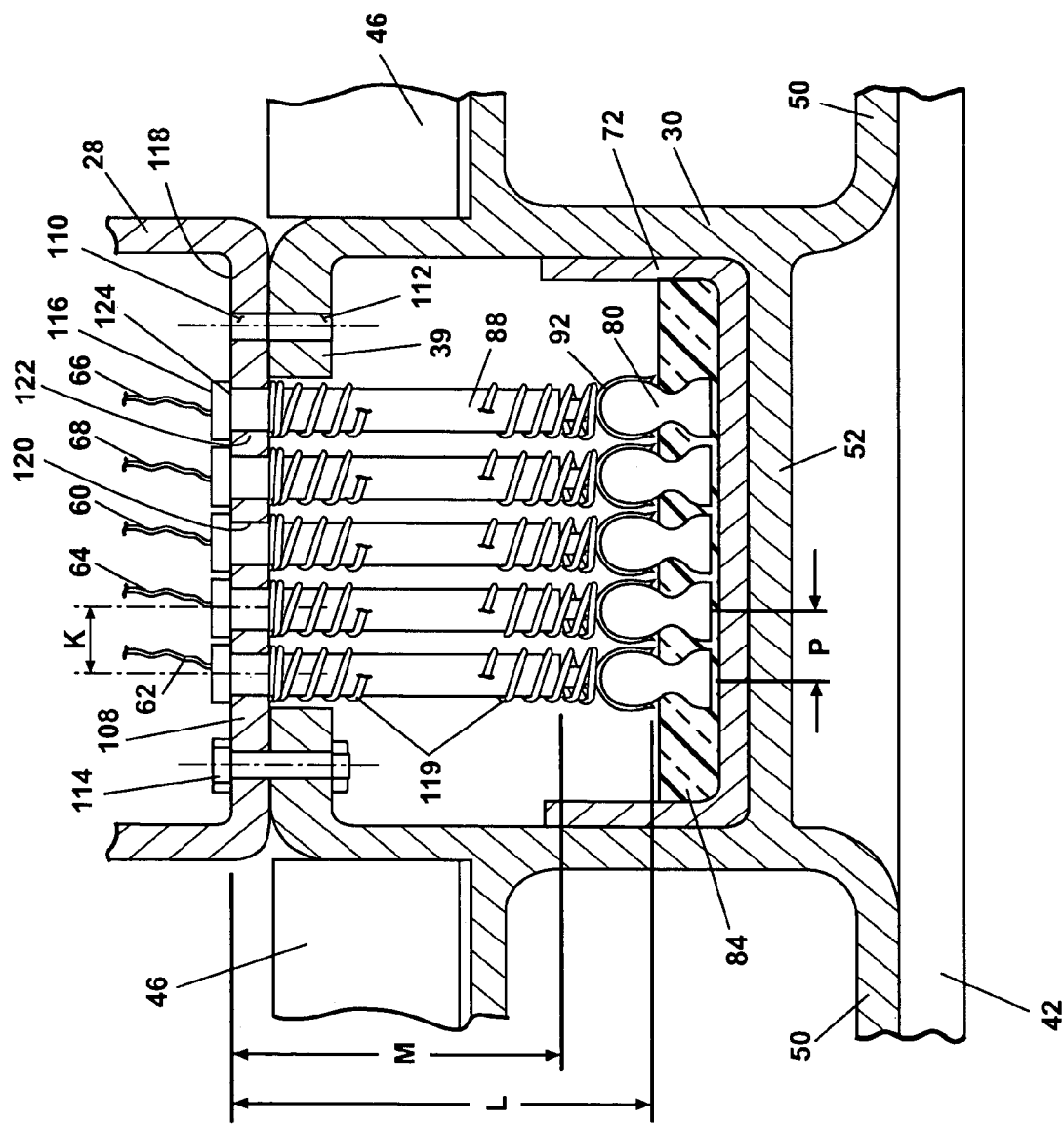
FIG. 5 is a cross-sectional view taken at section 5 of FIG. 2.

Referring next to FIG. 5, an exemplary connection between second seat leg 28 and second seat rail 30 according to one preferred embodiment of the present invention is shown. In a connected position shown, a leg support member 108 of second seat leg 28 is mechanically coupled to leg support end 39 of second seat rail 30 such that one or more apertures 110 are coaxially aligned with respective ones of a plurality of apertures 112 provided in leg support end 39. In this embodiment, fastener assembly 40 includes one or more fasteners 114 disposed in coaxially aligned apertures 110 and 112 to fastenably join second seat leg 28 to second seat rail 30. Fasteners 114 can include a bolt and nut combination (shown) or alternate fastener designs such as stud bolts or studs.

A mounting device 116 is provided at a distal end of each connector 88 such that each mounting device 116 abuts an interface 118 of leg support member 108. In the embodiment shown, five connectors 88 are provided, each connecting to an individual conductor 80 using U-shaped brackets 92 as previously discussed herein. Each of the wires 60, 62, 64, 66 and 68 exit respective ones of mounting devices 116 and are collectively grouped in wiring harness 58 (shown in FIG. 2). A predetermined spacing "L" is provided between interface 118 of leg support member 108 and a distal end of each of the U-shaped brackets 92. Each of connectors 88 are prefastened to leg support member 108 at the predetermined spacing "L". When seat group 22 is positioned to align first and second legs 26, 28 with first and second seat rails 29, 30, each seat leg is connected with its respective seat rail biasing each U-shaped bracket 92 about its respective conductor 80, and forming electrical conductivity paths between each conductor 80 and the electrical device connection panels 34 (shown in FIG. 2). Predetermined spacing "L" is controlled primarily by a predetermined length "M" of each connector 88, sized to provide full engagement of U-shaped brackets 92 with respective ones of conductors 80. In another aspect, tolerances can be accommodated for predetermined spacing "L" by using a plurality of biasing devices 119 (only one shown for clarity), which can be for example coiled springs, positioned between second seat leg 28 and U-shaped brackets 92. Biasing devices 119 allow an axial displacement of connectors 88 to accommodate differences in the relative positions of conductors 80 and connectors 88. A spring constant of biasing devices 119 is selected to allow upward deflection of connectors 88 to accommodate location tolerances while maintaining sufficient downward pressure on U-shaped brackets 92 to ensure proper engagement with conductors 80.

A connector pitch "K" is provided between each adjacent pair of connectors 88. Connector pitch "K" is substantially equivalent to conductor pitch "P" such that each U-shaped bracket 92 vertically aligns with a predetermined one of conductors 80. In one preferred embodiment of the present invention, conductor pitch "P" and therefore connector pitch "K" is approximately 0.73 cm (0.287 in). In another aspect of the invention, connectors 88 can also be staggered in a longitudinal direction of conductors 80 (toward or away from the viewer as viewed in FIG. 5), in addition to controlling connector pitch "K", to further reduce the risk of contact between connectors 88. By providing a staggered arrangement of connectors 88, connector pitch "K" can be reduced as viewed in FIG. 5 while maintaining the actual spacing between connectors 88.

Materials for first and second seat legs 26, 28 and first and second seat rails 29, 30 as well as seat support frame 41 are commonly a metal such as aluminum to provide strength with reduced weight. Because connectors 88 are substantially formed of a metal material for conductivity, connectors 88 are electrically isolated from leg support member 108 and thereby from first and second seat legs 26, 28 and seat support frame 41. Electrical isolation is provided using an insulating sleeve 120. Insulating sleeves 120 are disposed between connectors 88 and apertures 122 provided to align each connector 88 within leg support member 108 at connector pitch "K". Other methods to electrically isolate connectors 88 can also be used, including providing an electrical insulation layer disposed completely about an outer surface of connectors 88 or providing connectors 88 having rods 90 made of an electrically non-conductive material and each rod distal end 102 modified to extend throughout a length of connectors 88 to connect at a conductive junction with each mounting device 116. Mounting devices 116 are further electrically isolated from leg support member 108 using a plurality of washers 124 provided of an electrically insulating material. Insulating sleeves 120 and washers 124 can be provided of a polymeric material having electrical insulating properties such as polyamide.

Figure 6:
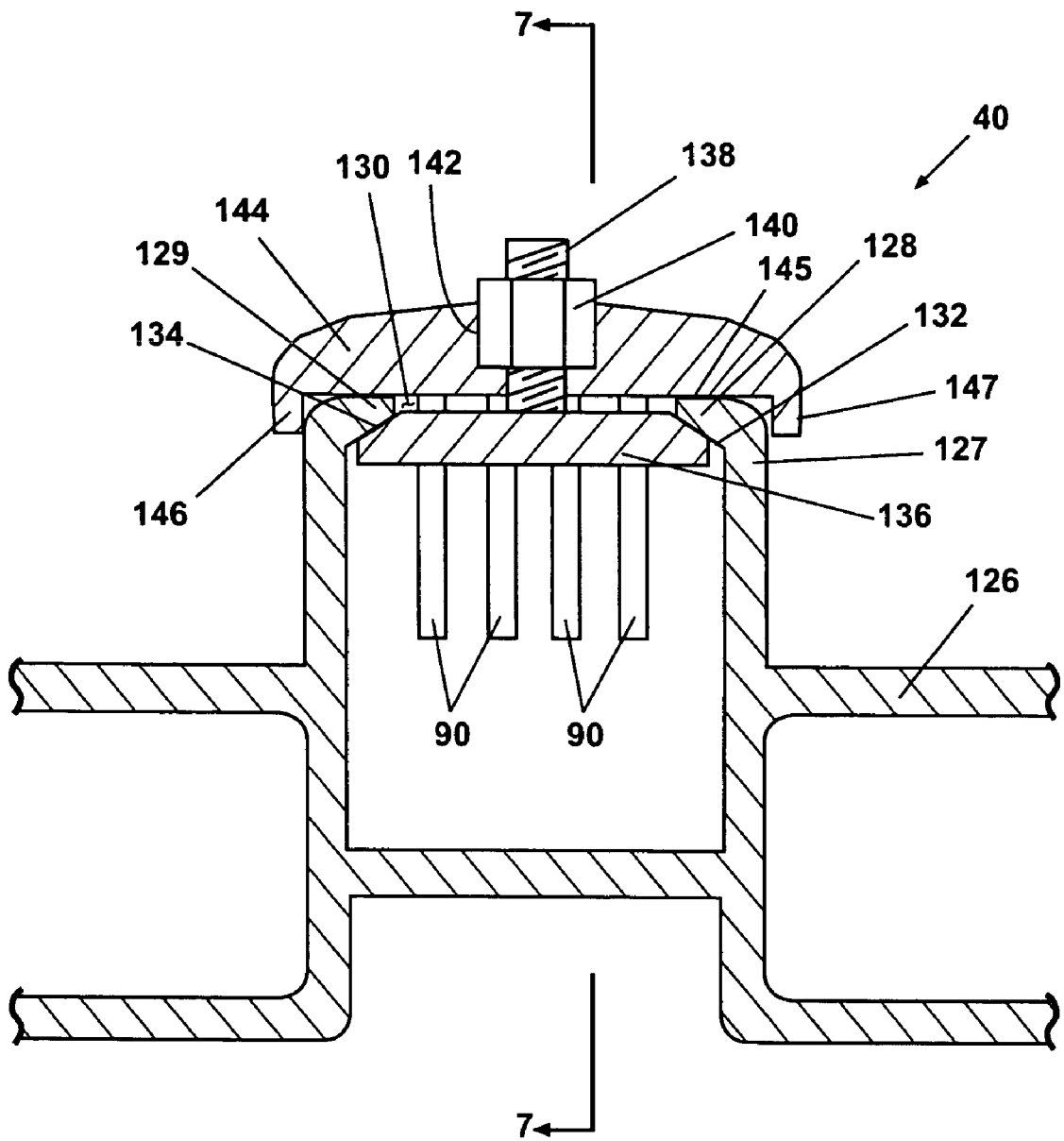
FIG. 6 is a cross-sectional view similar to FIG. 5 showing another embodiment of the present invention.
Figure 7:
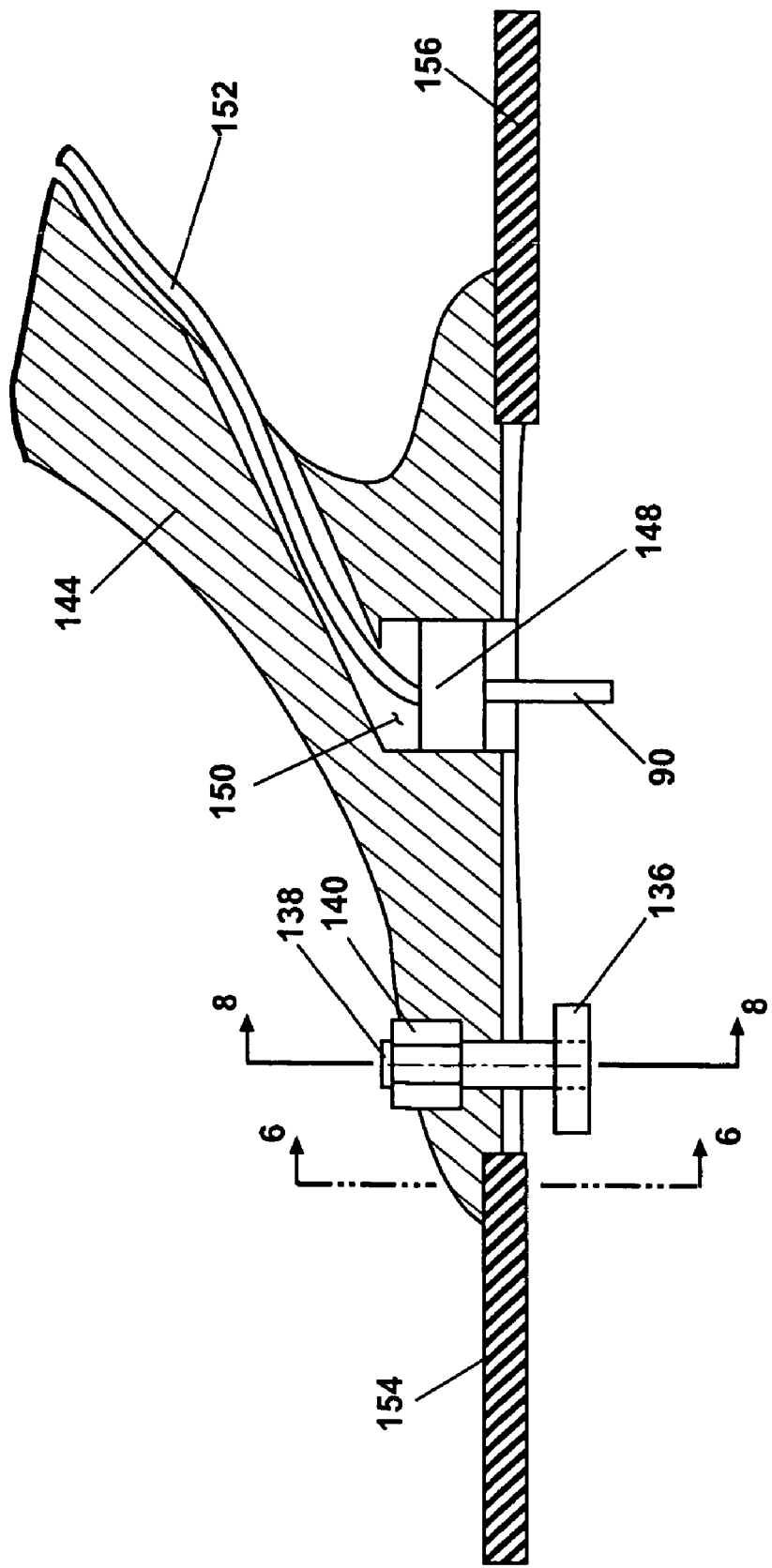
FIG. 7 is a cross sectional view taken at section 7—7 of FIG. 6.
Figure 8:
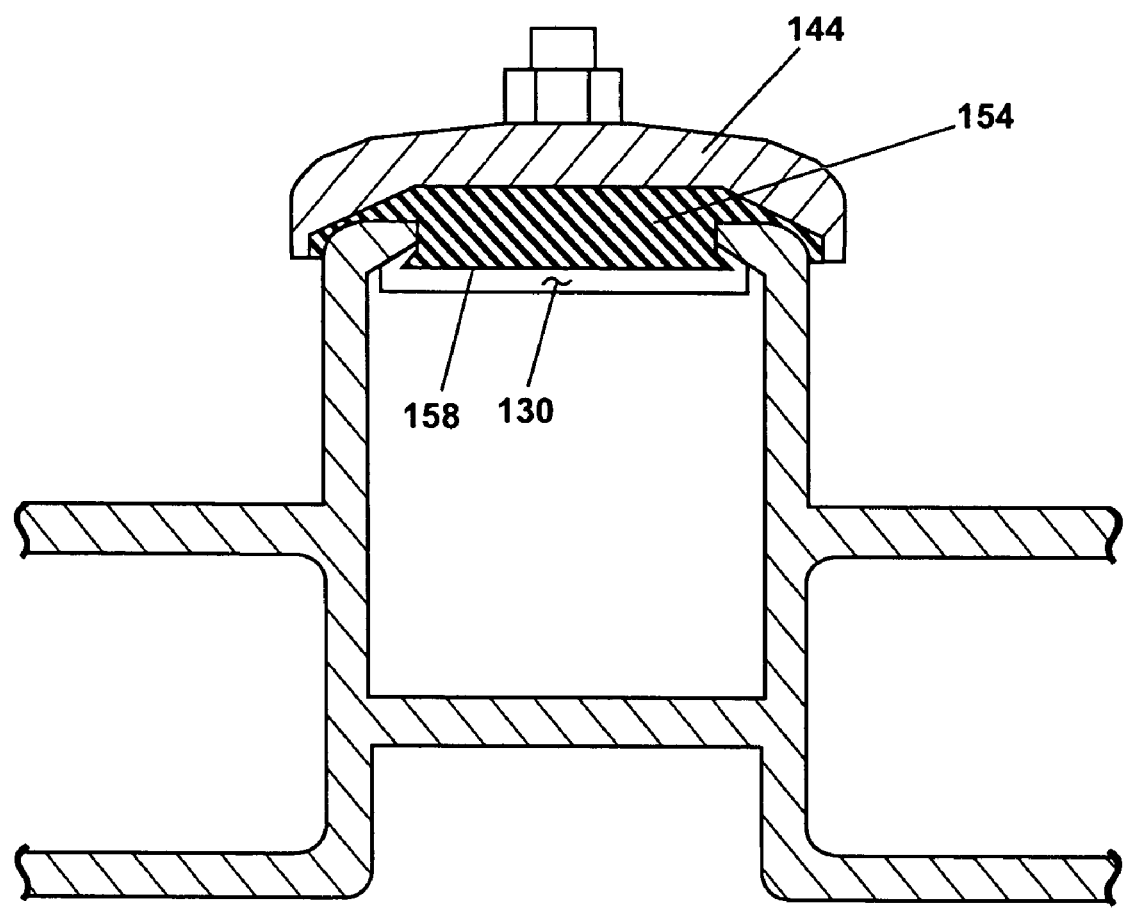
FIG. 8 is a cross sectional view taken at section 8—8 of FIG. 7.

According to another preferred embodiment and referring generally to FIGS. 6 through 8, a seat rail 126 is modified from seat rails 29 and 30 such that a support end 127 includes opposed first and second support legs 128,129 which define an aperture 130 there-between. Aperture 130 provides clearance for the plurality of rods 90. U-shaped brackets 92 are not shown in these views for simplicity. A beveled engagement surface 132 is provided for each first and second support leg 128,129 which engage a plurality of beveled contact surfaces 134 of a clamping plate 136. A stud 138 is threadably fastened to clamping plate 136 such that a freely extending portion of stud 138 extends through aperture 130. A nut 140 is threadably connected to a distal end of stud 138. Nut 140 is threaded onto stud 138 until it seats within a counterbored recess 142 provided in a seat leg 144. By seating nut 140 within recess 142, clamping plate 136 is engaged by beveled contact surfaces with first and second support legs 128,129, which also draws seat leg 144 into contact with seating surfaces 145 of support end 127. Seating surfaces 145 oppose beveled contact surfaces 134. In this way, seat leg 144 is connected to seat rail 126. Seat rail 126 can be used in place of either or both first and second seat rails 29,30.

A first and second extended lip 146,147 extend from seat leg 144 adjacent to outer members of seat rail 126. First and second extended lips 146,147 function to reduce displacement of seat leg 144 relative to seat rail 126, which reduces the chance for misalignment of U-shaped brackets 92.

As best seen in FIG. 7, a conductive rod holding member 148 is fixed within a cavity 150 created in seat leg 144. Conductive rod holding member 148 is preferably provided of a non-conductive material to support and electrically insulate rods 90 from seat leg 144. A wiring harness 152 groups each of the wires 60,62,64,66 and 68 (as well as any additional wires) leading to occupant seats 24.

A first and a second sealing cover 154,156 respectively, are provided to cover and seal aperture 130, which is generally formed as a continuous, longitudinally running slot within seat rail 126. Sealing covers 154,156 are similar in function to sealing cover 32. Variously sized sealing covers 154,156 can also be provided between individual connection points of first and second seat legs 26, 28 to first and second seat rails 29, 30, respectively, or between seat legs 144 and seat rails 126 to prevent entrance of dirt and/or moisture adjacent conductors 80. Sealing covers 32 and 154,156 can be provided of a polymeric material, a rubber material, a gasketed metal material or a combination of these materials. In the embodiment of FIGS. 6 through 8, sealing covers 154,156 are at least partially compressed and retained between seat leg 144 and seat rail 126. This retention method prevents ends of sealing covers 154,156 from disengaging from aperture(s) 130. Extending members 158 of sealing covers 154,156 also engage with beveled engagement surfaces 132 of support end 127 to help retain sealing covers 154,156 within aperture(s) 130.

In one preferred embodiment, conductors 80 are used to supply power to the electrical device connection panels 34 and are substantially exposed within cavity 54. In another aspect of the invention, conductors 80 can also carry digital signals which can be impacted by interference from adjacent higher current carrying conductors. In this case, all or individual ones of conductors 80 can be further covered with an insulation material within cavity 54 similar to the material of sealing covers 32 and 126, which is positioned directly in contact with conductors 80 to minimize this cross-conductor interference. This insulation material is removed to move one or more seat groups 22.

In one preferred embodiment of the present invention, conductors 80 and insulating medium 84 are provided as a co-extrusion which uses insulating medium 84 to bond conductors 80 in parallel alignment with each other. In another aspect of the present invention, conductors 80 and insulating medium 84 with trough 72 together form a co-extrusion for bus assembly 56. By co-extruding these items a bond between the items helps reduce moisture permeation.

An aircraft seat electrical quick disconnect system of the present invention offers several advantages. By attaching electrical connectors having female shaped connector legs to occupant seats and providing an electrical bus in the floor of the aircraft having parallel conductors arranged with the same spacing as the electrical connectors, the seats can be positioned at any location along the length of the bus and still provide connection to the bus. This permits aircraft passenger compartment configuration changes without the need to re-wire either the bus or the seats. By using male shaped conductors in the bus, the conductors can be extruded together with an insulating medium within a trough. The trough can then be positioned within a seat track of the aircraft. An opening in the trough permits access to the conductors, and the trough also provides enclosure walls which support a trough sealing cover to prevent dirt and moisture from entering the trough. The seats can also be unfastened from the seat track and slid along the track to a new location without requiring disconnection or re-connection of the connectors and the conductors. A biased, deflectable design of the connectors provides a positive connection to the conductors at any location along the conductors.

The description of the invention is merely exemplary in nature and, thus, variations that do not depart from the gist of the invention are intended to be within the scope of the invention. For example, the geometry of the bulbous head of the conductors can be modified to any substantially male shape which permits a positive biased connection by the connectors, including a generally square, rectangular or conical shape. The connectors can then be modified to match the configuration of the conductors. The generally rectangular-shaped trough of the present invention can also be varied in shape or design to suit the configuration of existing or new seat track designs. The quantity of conductors and connectors is also not a limiting feature, as fewer or greater numbers of conductors/connectors can be used depending on the number and type of electrical systems supported by the seats of the aircraft. An electrical bus of the present invention can also be connected to both support leg structures of the seats connected to the same or different electrical sources. In another aspect, the rod positioned between the connector and the seat can be changed in shape or quantity or eliminated if the arrangement permits. Such variations are not to be regarded as a departure from the spirit and scope of the invention.

The invention claimed is:

1. A mobile platform seat electrical connection system, comprising:
   a bus having a plurality of longitudinally extending substantially parallel conductors each having a portion fixedly embedded in an insulating medium, the conductors each including a bulbous shaped head and a neck supporting the head both positioned outside the insulating medium, the neck having a neck width less than a head width;
   at least one seat positioned within the mobile platform;

a plurality of connector members connectable to the seat, each of the connector members having a pair of legs substantially defining a C-shape, the legs operable to releasably engage the head of one of the conductors there between and transfer electrical energy between the one conductor and the seat;

wherein the seat having each of the connector members engaged with one of the conductors is infinitely longitudinally displaceable along the bus while maintaining an electrical contact between the seat and the conductors.

2. The connection system of claim 1, wherein the at least one seat further comprises a support frame, the connector members being connectable to the support frame.

3. The connection system of claim 1, wherein the seat further comprises at least one electrical device connection panel electrically connectable to the connector members.

4. The connection system of claim 1, wherein individual ones of the plurality of conductors are connectable to individual ones of a plurality of electrical sources.

5. The connection system of claim 4, wherein the plurality of electrical sources includes at least one of an alternating current source, a direct current source, a telephone signal source, an Internet communication signal source, an electronic acoustic signal source, an ARINC signal source and an electronic voice signal source.

6. The connection system of claim 4, wherein each conductor is separable from an adjacent one of the conductors by an insulating medium.

7. The connection system of claim 6, further comprising:
a substantially C-shaped metal trough having the plurality of conductors and the insulating medium disposed therein, the trough positionable within a seat support structure of the mobile platform;
wherein individual ones of the connector members are alignable with individual ones of the plurality of conductors of the bus via an opening in the trough in an installed position of the seat.

8. The connection system of claim 7, wherein the plurality of conductors are positionable in parallel alignment with each other, each conductor being spaced from an adjacent one of the conductors by a predetermined pitch.

9. The connection system of claim 1, wherein each leg of the pair of legs of the connector member is elastically deflectable and each leg includes a distal end, the distal ends of the pair of legs being separated by a separation width narrower than the neck width, wherein a biasing force created by deflection of the elastically deflectable legs about both the neck and head widths of the conductor during installation of the seat biases the connector member into electrical contact with the conductor.

10. A mobile platform seat electrical connection system, comprising:
an electrical bus including a plurality of conductors;
a substantially C-shaped metallic trough having an insulating medium disposed therein, the insulating medium fixedly retaining the plurality of conductors in a substantially parallel configuration;
each of the conductors including a base captured in the insulating medium, a bulbous shaped head and a neck connected to the head operable to support the conductor within the trough, the neck having a neck width smaller than a head width, both the neck and the head positioned outside of the insulating medium;
a plurality of occupant seats positionable within the mobile platform; and
a plurality of connector members connectable to individual ones of the seats, each connector member operable to releasably engage one of the conductors when the seat is positioned to align with the trough, and to transfer electrical energy between the conductor and the individual seat;
wherein any one of the seats is releasably positionable at any selected location along the electrical bus.

11. The connection system of claim 10, wherein each of the connector members further includes a rod connectable between the connector member and the seat, wherein the rod includes a predetermined length adaptable to position the connector member for engagement with one of the conductors.

12. The connection system of claim 10, wherein each of the conductors is connectable to a different one of a plurality of electrical sources.

13. The connection system of claim 12, wherein a selected quantity of the connector members is connected to the seat such that the seat is connectable to selected ones of the electrical sources.

14. The connection system of claim 10, further comprising:
a floor web of the trough wherein a portion of the insulating medium is positioned between the floor web and the base of each of the plurality of conductor members; and
an opposed pair of walls of the trough defining an opening between the opposed walls through which the connector members are connectable to the conductors.

15. The connection system of claim 10, wherein the plurality of seats comprises a plurality of seat groups, each seat group having at least one seat, wherein each seat of each seat group is connectable to a common location along the electrical bus.

16. The connection system of claim 10, wherein the conductors, the insulating medium and the trough comprise a co-extruded assembly.

17. The connection system of claim 10, further comprising a seat track connectable to a floor of the mobile platform, wherein the trough is disposed within the seat track.

18. The connection system of claim 10, wherein each connector member includes a pair of deflectable members operably forming a C-shape, the deflectable members operable to releasably engage the head of one of the conductors.

* * * * *